United States Patent
Chimot et al.

(10) Patent No.: US 9,395,596 B2
(45) Date of Patent: Jul. 19, 2016

(54) RING RESONATOR COMPRISING OPTICAL FILTERING DEVICE

(71) Applicant: Commissariat a l'Engerie Atomique et aux Energies Alternatives, Paris (FR)

(72) Inventors: Nicolas Chimot, Bruyeres le Chatel (FR); Francois Lelarge, Paris (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 326 days.

(21) Appl. No.: 14/218,044

(22) Filed: Mar. 18, 2014

(65) Prior Publication Data

US 2016/0161824 A1 Jun. 9, 2016

(30) Foreign Application Priority Data

Mar. 21, 2013 (EP) .................................... 13305347

(51) Int. Cl.
| | |
|---|---|
| *G02F 1/035* | (2006.01) |
| *G02F 1/313* | (2006.01) |
| *G02F 1/025* | (2006.01) |
| *G02F 1/225* | (2006.01) |
| *G02F 1/01* | (2006.01) |
| *G02B 6/12* | (2006.01) |
| *G02F 1/015* | (2006.01) |

(52) U.S. Cl.
CPC .......... *G02F 1/3136* (2013.01); *G02B 6/12004* (2013.01); *G02F 1/0147* (2013.01); *G02F 1/025* (2013.01); *G02F 1/2257* (2013.01); *G02B2006/12061* (2013.01); *G02F 2001/0151* (2013.01)

(58) Field of Classification Search
CPC ... G02F 1/0147; G02F 2203/15; G02F 1/132; G02B 6/2934; G02B 6/29395
USPC .................. 385/1, 2, 15, 48; 398/48
See application file for complete search history.

(56) References Cited

U.S. PATENT DOCUMENTS

| | | | | |
|---|---|---|---|---|
| 9,140,914 | B1* | 9/2015 | Ptasinski | ................. G02F 1/132 |
| 2007/0258677 | A1* | 11/2007 | Chigrinov | .......... G02B 6/12007 385/15 |
| 2015/0063801 | A1* | 3/2015 | Ishizaka | ................ G02F 1/2257 398/48 |

FOREIGN PATENT DOCUMENTS

| | | |
|---|---|---|
| EP | 1158326 A2 | 11/2001 |
| EP | 1786121 A1 | 5/2007 |

OTHER PUBLICATIONS

J. Leuthold; C.H. Joyner; "Multimode Interference Couplers with Turnable Power Splittling Ratios"; Journal of Lightwave Technology, vol. 19, No. 5, May 2001.
May-Arrioja D A et al.; "Reconfigurable 3-db MMI splitter"; IEEE/LEOS Summer Topical Meetings, 2008 Digest of the, IEEE, Piscataway, NJ, Jul. 21, 2008; pp. 39-40; ISBN: 987-1-4244-1925-8.
Antonio-Lopez J E et al.; "Tunable Multimode-interference Bandpass Fiber Filter"; Optics Letters, The Optical Society, vol. 35, No. 3; Feb. 1, 2010; pp. 324-326.

* cited by examiner

*Primary Examiner* — Ellen Kim
(74) *Attorney, Agent, or Firm* — Blank Rome LLP; Michael C. Greenbaum; Jonathan R. King

(57) ABSTRACT

An optical filtering device (1) comprising:
a ring resonator (2); and
a multimode interference coupler (3) comprising two inputs (4, 7), two outputs (5, 8) and a multimode waveguide (9) connecting the two inputs to the two outputs, the coupler having a first input (4) serving as an input for the filtering device and able to receive an input optical signal (10), and a first output (5) corresponding to the output of the filtering device and able to produce an output optical signal (12), the ring resonator (2) being arranged so as to connect a second output (8) of the coupler to a second input (7) of the coupler, wherein the filtering device comprises
a tuning element (6) able to modify locally the refractive index in the coupling zone (11) of said multimode waveguide (9) in order to vary a coupling coefficient between the coupler (3) and the ring resonator (2).

15 Claims, 2 Drawing Sheets

RING RESONATOR COMPRISING OPTICAL FILTERING DEVICE

REFERENCE TO RELATED APPLICATION

The present application claims the benefit of European Patent Application No. 13305347.0, filed Mar. 21, 2013, whose disclosure is hereby incorporated by reference in its entirety into the present disclosure.

TECHNICAL FIELD

The invention relates to the field of communication via optical means and more particularly to devices for filtering optical signals, able to be used to receive and emit optical signals.

TECHNOLOGICAL BACKGROUND

Fiber-optic transmission makes use of the wavelength division multiplexing (WDM) technique. As with any multiplexing technique, this technique consists in combining, over a given medium, a plurality of modulated signals. In the case of optical communication, the medium is none other than an optical fiber conveying signals in different channels. These channels are defined by the carrier wavelength of the transmitted signals. Wavelength multiplexing, which will be referred to as WDM below, requires high-quality signal emission. The need for high-quality signal emission increases as wavelengths are brought closer together. Specifically, a shift in the wavelength of an emitted signal may produce various edge effects. For example, such a shift many lead to interference with a signal at a neighboring wavelength. It also causes problems on reception, especially during the demultiplexing step. Similarly, the quality of the components used directly impacts the quality of the processing and, therefore, the usable distances or passbands. Specifically, the bandwidth of a line connected to a demultiplexer especially depends on the quality of the components in charge of the filtering allowing a signal at a given wavelength to be extracted. At the present time, obtainable manufacturing tolerances are a bandwidth-limiting factor.

SUMMARY

One idea behind the invention is to provide an optical filtering device having an adjustable transfer function, usable in any type of equipment.

According to one embodiment, the invention provides an optical filtering device comprising:
a ring resonator; and
a multimode interference coupler comprising two inputs, two outputs and a multimode waveguide connecting the two inputs to the two outputs, the coupler having a first input serving as an input for the filtering device and able to receive an input optical signal, and a first output corresponding to the output of the filtering device and able to produce an output optical signal, the wavelength comprising a coupling zone arranged between the inputs and outputs and able to form four images of the input signal,
the ring resonator being arranged so as to connect a second output of the coupler to a second input of the coupler,
wherein the filtering device comprises
a tuning element able to modify locally the refractive index in the coupling zone of said multimode waveguide in order to vary a coupling coefficient between the coupler and the ring resonator.

By virtue of these features, it is possible to tune the splitting ratio of the optical signal between the two outputs of the coupler. This tuning allows the coupling coefficient with the ring resonator to be modified. This consequently modifies the ratio between the high level and the low level of an optical signal, in order to improve the quality of a digital optical signal. Thus, it is possible by design to define the transfer function of the filter, and to adjust it in operation.

Embodiments of such an optical filtering device may comprise one or more of the following features.

According to one embodiment, the tuning element is able to modify the refractive index in a central part of the coupling zone, covering two central images in the waveguide. According to one embodiment, the tuning element is able to modify the refractive index in a peripheral part of the coupling zone covering two peripheral images in the waveguide, the peripheral part being centered in the longitudinal direction of the waveguide.

By virtue of these features, the refractive index of the waveguide at the longitudinal midpoint may differ between the center and the exterior in the transverse direction. Thus, two zones of different indices are created, modifying the splitting of the optical signal between the two outputs of the coupler.

According to one embodiment, the tuning element is able to modify the temperature of the coupling zone in order to modify the refractive index.

According to one embodiment, the tuning element comprises a resistive heater arranged on the coupling zone. According to one embodiment, the tuning element comprises a heating film deposited on the coupling zone.

By virtue of these features, the refractive index of the waveguide is modified via the thermo-optic effect. The temperature gradient applied locally to the waveguide creates a local strain by dilating the crystal lattice. It is this strain that is the source of the refractive index variation.

According to one embodiment, the tuning element is able to inject electrical charge into the coupling zone, decreasing the refractive index. According to one embodiment, the tuning element comprises a metal electrode arranged on a part centered in the longitudinal direction of the waveguide.

By virtue of these features, the refractive index is modified via the electro-optic effect. Increasing the electron density locally results in a decrease in refractive index. This is what is called the plasma effect.

According to one embodiment, the coupler has an optical length corresponding to a coupling coefficient by default equal to 50%, such that half the input optical signal is transmitted to the first output and half is transmitted to the second output.

According to one embodiment, the filter has coupling conditions corresponding to the conditions for critical coupling, so that the ratio between the high and low levels of an optical signal on the first output may be varied over a range of at least 30 dB by varying the coupling coefficient by only 10%.

According to one embodiment, the ring resonator is able to filter the input signal in order to remove from its output a component of the input signal corresponding to a wavelength $\lambda$, and harmonics of $\lambda$.

According to one embodiment, the device furthermore comprises a module for adjusting the wavelengths filtered by the ring resonator, the adjusting module being able to modify a physical property of the ring resonator in order to tune the wavelengths filtered by the ring resonator.

According to one embodiment, the adjusting module is able to modify the temperature of the ring resonator.

According to one embodiment, the ring resonator, the coupler, and the tuning element are monolithically integrated into an integrated optical component.

By virtue of these features, it is possible to adjust the filtering frequency of the ring resonator. For example, this makes it possible, via fine tuning, to match the filter to a source such as a laser source.

According to one embodiment, the component comprises a silicon substrate. According to one embodiment, the component comprises an indium phosphide substrate.

The idea behind certain aspects of the invention is to associate a ring resonator and a multimode interference coupler so as to allow the coupling factor, also called the coupling coefficient, of the ring resonator to be tuned in order to obtain a passive optical filtering device.

The idea behind certain aspects of the invention is to produce a low-cost filter. The idea behind certain aspects of the invention is to provide a filter having a small bulk. The idea behind certain aspects of the invention is to provide an entirely integrated solution.

The idea behind certain aspects of the invention is to use a passive semiconductor, i.e. a semiconductor having a limited absorption at the wavelength of the optical signal, in order to decrease power losses in the device.

BRIEF DESCRIPTION OF THE FIGURES

The invention will be better understood, and other aims, details, features and advantages thereof will become more clearly apparent from the following description of any number of particular embodiments of the invention, which are given merely by way of nonlimiting illustration and with reference to the appended drawings.

DETAILED DESCRIPTION OF THE EMBODIMENTS

Figure 1:
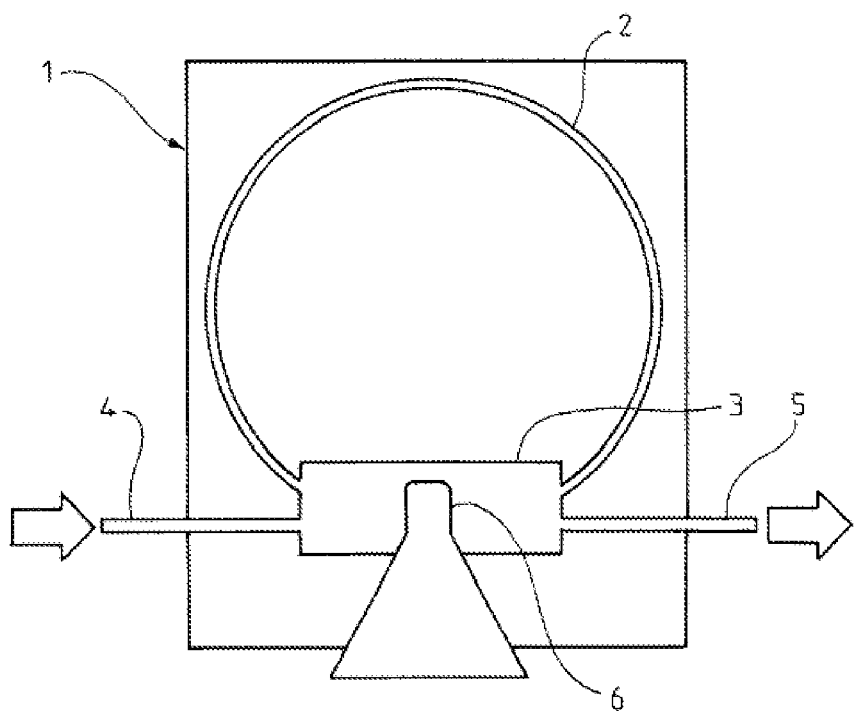
FIG. 1 is a schematic functional representation of an optical filter.

FIG. 1 shows an optical filtering device 1 comprising a ring resonator 2 associated with a multimode interference (MMI) coupler 3. This filtering device 1 comprises an input 4 and an output 5. The filtering device 1 is adjustable using an electrode 6 arranged in a zone on the MMI coupler 3. The electrode 6 is for example made of metal.

The input 4 allows any optical communication source, such as an optical fiber or a laser, to be coupled to the filtering device 1. The output 5 delivers an output signal corresponding to the input signal depending on the transfer function of the filtering device 1.

To tune the coupler, the electrode 6 allows current to be injected into the zone of the MMI coupler 3, creating a plasma effect. As a variant, the electrode 6 allows the temperature of the coupler 3 to be modified in the zone, in order to take advantage of a thermo-optic effect in the MMI coupler 3.

Figure 2:
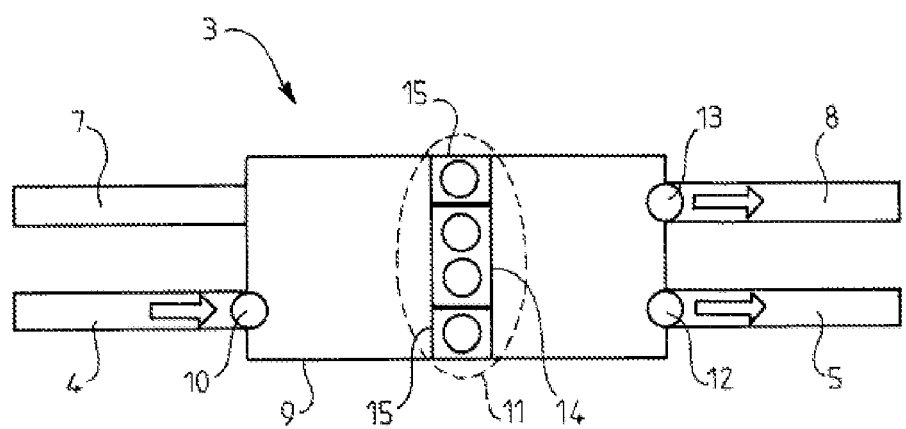
FIG. 2 is a schematic functional representation of the multimode interference coupler of the filter in FIG. 1.

With reference to FIG. 2, the MMI coupler 3 in FIG. 1 will now be described. This MMI coupler 3 is a 2×2 coupler, i.e. it comprises two inputs 4 and 7 and two outputs 5 and 8, between which a multimode waveguide 9 is arranged. The waveguide 9 is as short and wide as possible in order to increase its passband and manufacturing tolerances, while still providing 2×2 transmission.

In operation, the MMI coupler 3 receives an input image 10 on one 4 of its inputs. Via interference effects in the waveguide 9, one or more images reproduce this input image 10 at periodic intervals in the waveguide 9. The duplication of the input image 10 takes place in the direction of propagation of the light from the input 4 to the outputs 5 and 8. In this 2×2 MMI coupler 3, the input image 10 is reproduced in order to provide four images in a zone 11 midway through the waveguide 9. The splitting ratio of the input image 10, between the output images 12 and 13 is preferably 50%, fixed by the design of the MMI coupler 3. This means that the radiant powers of the output images 12 and 13 are equal. As a variant, the design-fixed splitting ratio is not 50% for each output 5, 8, in order to produce output images 12 and 13 having different radiant powers.

The stability of the splitting ratio depends on the refractive index in the zone 11. Specifically, by default the refractive index is constant throughout the zone 11. If the refractive index of a centered zone 14 containing the 2 central images differs from the refractive index of a peripheral zone 15, it leads, in the zone 11, to a modification in the phase relationship between the images in the centered zone 14 relative to the peripheral zone 15. This modification affects the output images 12 and 13 and therefore impacts the splitting ratio, which varies in favor of one or other of the output images 12, 13.

Figure 3:
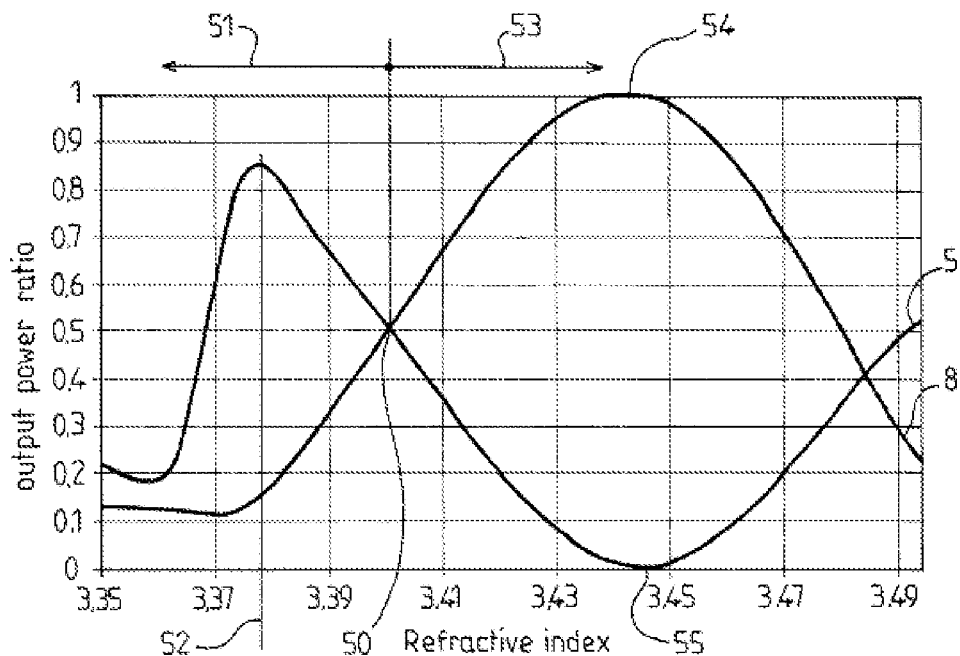
FIG. 3 is a graph of the variation in the splitting ratio of the power of the light signals as a function of the refractive index of the multimode interference coupler in FIG. 2.

With reference to FIG. 3, the variation in the splitting ratio of the power of an input signal between the light signals of the outputs 5 and 8 as a function of the variation in the refractive index of the centered zone 14 may be seen. This curve corresponds to the transfer function of a passive semiconductor the absorption of which is not too high at the wavelength of the input signal. Here it is a question of a quaternary material having a bandgap at a wavelength of 1.3 μm, through which an optical signal with a wavelength of 1.55 μm passes.

As this graph shows, at the point 50, and under standard operating conditions without modification of the refractive index of the centered zone 14 of the waveguide 9, the MMI coupler 3 transfers half the power of the input optical signal to each output. The power on the outputs is perfectly equal.

In order to change this split, the refractive index may be modified using two methods. The first, which will be referred to as the plasma effect, may be obtained by current injection, i.e. increasing electron density in the injection region. The result of the current injection is to decrease the refractive index, and corresponds to the portion 51 of the graph. The power of the signals reproduced on each output is then inversely proportional. While the power of the optical signal increases on the output 5, it decreases on the other. Below a refractive index threshold 52 the behavior changes with the power of the two output signals decreasing to reach a power floor level. Below this threshold 52, the sum of the ratios between the outputs is no longer equal to 1.

The second method, which will be referred to as the thermo-optic effect, corresponds to a tuning of the temperature in the centered zone 14. The effects of this tuning may be seen in the portion 53 of the graph. In this case, the power on the output 5 decreases with the increase in refractive index, whereas the power on the output 8 increases. This increase continues until a peak with a ratio of 100:0% is obtained at the points 54, 55. In this case, all the power of the signal is transmitted to the output 8 to the detriment of the output 5. The MMI coupler 3 then behaves as an on/off switch. Above this threshold, the temperature increase continues to make the refractive index increase but the effect on the power splitting is reversed.

It will be noted that, independently of whether the thermal or thermo-optic effect is used, a variation in the refractive index of about +0.05 is all that is required to make the ratio change from 50:50% to a ratio of 0:100%. It is the electrode 6 shown in FIG. 1 that is used to vary the splitting ratio between the outputs of the MMI coupler 3.

As a variant, exactly identical results are obtained if, for example, silicon is used.

The reader may find more ample details on the operation of a 2×2 MMI coupler in the article "Multimode interference couplers with tunable power splitting ratios" by J. Leuthold and C. H. Joyner, publisher IEEE/OSA, Journal of Lightwave Technology, May 2001, volume 19, number 5.

Figure 4:
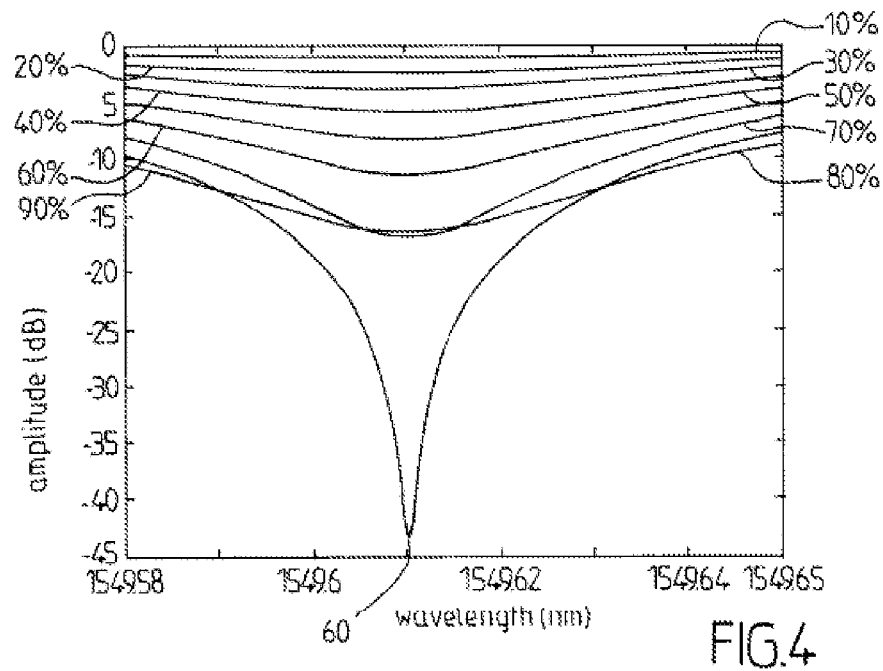
FIG. 4 is a graph of the transfer function of a ring resonator of the filter in FIG. 1 as a function of wavelength, for various values of its coupling coefficient.

With reference to FIG. 4 the behavior of a single ring resonator 2 coupled to a straight waveguide will now be described. This ring resonator is a filter that attenuates one wavelength and all the wavelengths spaced by the free spectral range (also denoted FSR). This ring resonator is therefore a filter that filters wavelengths spaced by a period corresponding to the FSR. In the frequency domain, this is the same as saying that the ring resonator filters a fundamental frequency and its harmonics. The free spectral range is inversely proportional to the radius of the ring resonator.

The filter operates in the following way: when an optical wave is injected into one end of the straight waveguide, a fraction of this wave transfers by coupling into the ring resonator. The fraction of the wave that is not transferred into the ring resonator meets the output wave, causing destructive interference at certain specific wavelengths.

In FIG. 4, the ring resonator filters the wavelength referenced 60. The figure shows that the attenuation caused by the ring resonator is dependent on the coupling factor, also called the coupling coefficient, between the ring resonator and a waveguide. Thus, for a coupling factor of 10% the attenuation, which is similar at all frequencies, is 1 or 2 dB. For a coupling factor of 70%, the attenuation is higher at the wavelength 60 than at the other wavelengths. Here the attenuation is maximized for a coupling factor of about 80%, corresponding to the critical coupling factor of the ring resonator and waveguide. Here, internal losses in the ring resonator are 6.5 $cm^{-1}$.

In the filtering device in FIG. 1, the ring resonator 2 is coupled to the input 4/output 5 by the MMI coupler 3 inserted in the circuit of the ring. In this case, the splitting ratio of the MMI coupler 3 corresponds to the coupling factor or coupling coefficient of the ring resonator 2. Thus, using the electrode 6, it is possible to vary the amount of power that passes into the ring relative to that transmitted to the output 5.

This tuning also affects the ratio between the high level and the low level of the transfer function of the ring resonator, in the same way as the internal losses of the ring. To meet the critical coupling condition, it is necessary for the coupling losses to be equal to the internal losses of the ring. In other words, it is necessary to adjust the splitting ratio of the MMI coupler 3 using the electrode 6 to meet this condition. In this way, control of the ratio between the high level and the low level of the ring resonator is obtained with a simple passive waveguide that is totally compatible with a strategy for photonic integration on silicon.

According to one embodiment, the filtering device described in FIG. 1 comprises, as a variant, a mechanism for tuning the temperature of the ring resonator (not shown in FIG. 1). This mechanism allows the internal refractive index of the ring to be modified via the thermo-optic effect and thus allows the resonance wavelength of the ring resonator to be modified. Thus, it is possible to finely tune the wavelength defined beforehand during design by the choice of the radius of the ring. Depending on the application, the ring may then be matched to the wavelength of the laser to which the device is connected.

The tuning mechanism is arranged covering the ring resonator. Preferably, the mechanism does not cover the MMI coupler in order not to interfere with the tuning carried out using the metal electrode. The mechanism allowing this tuning to be carried out is for example a module employing the thermoelectric effect referred to as the Peltier effect. The mechanism may also be a metal electrode.

This optical filtering device may be used in equipment of a passive optical network, for example using the WDM technique.

For example, such a filter may be used in a demultiplexer. In this case, a different filtering device is used for each wavelength to be extracted from the WDM signal. In parallel, each filter receives the input WDM signal and delivers as output the input signal from which the wavelengths rejected by the filter have been removed. The output signal on a line of the demultiplexer is obtained by destructive interference between the input signal and the signal produced by the filter. More details of this type of application are given in the article "Design of 16 Channel Multiplexer using SOI ring resonator Array" by Usha Raghunath, Malathi S, Yedhu Krishna, T. Srinivas, and Govind Kadambi.

A second type of application capable of benefiting from the filtering device is that of optical spectrum reshapers (or OSRs). The aim of this type of corrector is to correct frequency drift between the 0's and 1's of a digital signal, i.e. between the low level and the high level of the signal. The filter especially allows, in this type of application, the radiant power of the low level to be suppressed relative to that of the high level, and therefore the power ratio between the two levels to be increased. OSRs are for example used at the output of lasers to shape signals. Thus, it is possible to improve the quality of the source and of the non-return-to-zero (NRZ) signal transmitted. Such an application is described in greater detail in document US 2010/0098436 A1.

Such a filter may also be used in an electro-optic modulator producing an amplitude modulation by changing refractive index using the charge injection obtained via the metal electrode. Such an application is described in the article "Polymer Micro-Ring Filters and Modulators".

Although the invention has been described by way of a simple filtering device, it is obvious that it may be employed in much more complex ring resonator architectures employing rings in parallel or in series. For example, it may be used in Mach-Zehnder interferometers for various modulation formats such as QPSK, DQPSK or QAM.

Certain of the elements shown, especially the control units, may be produced in various unitary or distributed forms, by means of hardware and/or software components. Usable hardware components include application-specific integrated circuits (ASICs), field-programmable gate arrays (FPGAs) and microprocessors. The software components may be written in various programming languages, for example C, C++, Java or VHDL. This list is not exhaustive.

Although the invention has been described by way of a number of particular embodiments, it is of course obvious that the invention is in no way limited to these embodiments and that it comprises all the technical equivalents of the means described and their combinations if the latter do not depart from the scope of the invention.

The invention may for example be produced using technologies based on group III-V materials.

The use of the verbs "to contain", "to comprise" or "to include" and their conjugated forms does not exclude the presence of elements or steps other than those defined in a claim. The use of the indefinite article "a" when describing an element or a step does not exclude, unless otherwise stated, the presence of a plurality of such elements or steps.

In the claims, any reference sign between parentheses in no way limits the scope of the claim.

The invention claimed is:

1. An optical filtering device (1) comprising:
   a ring resonator (2); and
   a multimode interference coupler (3) comprising two inputs (4, 7), two outputs (5, 8) and a multimode waveguide (9) connecting the two inputs to the two outputs, the coupler having a first input (4) serving as an input for the filtering device and able to receive an input optical signal (10), and a first output (5) corresponding to the output of the filtering device and able to produce an output optical signal (12), the waveguide comprising a coupling zone (11) arranged between the inputs and outputs and able to form four images of the input signal, the ring resonator (2) being arranged so as to connect a second output (8) of the coupler to a second input (7) of the coupler,
   wherein the filtering device comprises
   a tuning element (6) able to modify locally the refractive index in the coupling zone (11) of said multimode waveguide (9) in order to vary a coupling coefficient between the coupler (3) and the ring resonator (2).

2. The device as claimed in claim 1, wherein the tuning element (6) is able to modify the refractive index in a central part (14) of the coupling zone (11), covering two central images in the waveguide (9).

3. The device as claimed in claim 1, wherein the tuning element (6) is able to modify the refractive index in a peripheral part (15) of the coupling zone (11) covering two peripheral images in the waveguide (9), the peripheral part (15) being centered in the longitudinal direction of the waveguide (9).

4. The device as claimed in claim 1, wherein the tuning element (6) is able to modify the temperature of the coupling zone (11) in order to modify the refractive index.

5. The device as claimed in claim 1, wherein the tuning element (6) is able to inject electrical charge into the coupling zone (11) decreasing the refractive index.

6. The device as claimed in claim 1, wherein the tuning element (6) comprises a metal electrode arranged on a part centered in the longitudinal direction of the waveguide.

7. The device as claimed in claim 1, wherein the tuning element (6) comprises a resistive heater arranged on the coupling zone (11).

8. The device as claimed in claim 1, wherein the tuning element (6) comprises a heating film deposited on the coupling zone (11).

9. The device as claimed in claim 1, wherein the coupler (3) has an optical length corresponding to a coupling coefficient by default equal to 50%, such that half the input optical signal (10) is transmitted to the first output (5) and half is transmitted to the second output (8).

10. The device as claimed in claim 1 furthermore comprising a module for adjusting the wavelengths filtered by the ring resonator, the adjusting module being able to modify a physical property of the ring resonator (2) in order to tune the wavelengths filtered by the ring resonator.

11. The device as claimed in claim 10, wherein the adjusting module is able to modify the temperature of the ring resonator (2).

12. The device as claimed in claim 1, in which the ring resonator (2), the coupler (3), and the tuning element (6) are monolithically integrated into an integrated optical component.

13. The device as claimed in claim 1, in which the component comprises a silicon substrate.

14. The device as claimed in claim 1, in which the component comprises an indium phosphide substrate.

15. The device as claimed in claim 1, in which the ring resonator (2) is able to filter the input signal (10) in order to remove from its output a component of the input signal corresponding to a wavelength $\lambda$ and harmonics of $\lambda$.

* * * * *